United States Patent
Gunner et al.

(10) Patent No.: US 11,697,174 B2
(45) Date of Patent: Jul. 11, 2023

(54) DIFFUSION BONDING WITH A BONDING SURFACE COATING MATERIAL

(71) Applicant: TWI LIMITED, Cambridge (GB)

(72) Inventors: Alec Gordon Gunner, Cambridge (GB); Nicholas Philip Ludford, Cambridge (GB)

(*) Notice: Subject to any disclaimer, the term of this patent is extended or adjusted under 35 U.S.C. 154(b) by 0 days.

(21) Appl. No.: 17/053,787

(22) PCT Filed: May 9, 2019

(86) PCT No.: PCT/GB2019/051279
§ 371 (c)(1),
(2) Date: Nov. 8, 2020

(87) PCT Pub. No.: WO2019/215449
PCT Pub. Date: Nov. 14, 2019

(65) Prior Publication Data
US 2021/0220943 A1 Jul. 22, 2021

(30) Foreign Application Priority Data
May 9, 2018 (GB) .................................. 1807572

(51) Int. Cl.
B23K 20/24 (2006.01)
B23K 20/02 (2006.01)
B23K 103/10 (2006.01)

(52) U.S. Cl.
CPC .............. *B23K 20/24* (2013.01); *B23K 20/02* (2013.01); *B23K 2103/10* (2018.08)

(58) Field of Classification Search
CPC ..................................................... B23K 20/24
See application file for complete search history.

(56) References Cited

U.S. PATENT DOCUMENTS

| 3,632,410 A | * | 1/1972 | Vargo | ....................... C23G 5/00 228/206 |
| 3,634,338 A | * | 1/1972 | Laugle et al. | ........... C11D 1/37 134/40 |

(Continued)

FOREIGN PATENT DOCUMENTS

| CN | 104084691 A | 10/2014 |
| GB | 1486979 A | 9/1977 |

(Continued)

OTHER PUBLICATIONS

Y. Huang, F.J. Humphreys, N. Ridley & Z. C. Wang (1998) Diffusion bonding of hot rolled 7075 aluminium alloy, Materials Science and Technology, 14:5, 405-410, DOI: 10.1179/mst.1998. 14.5.405 (Year: 1998).*

(Continued)

*Primary Examiner* — Erin B Saad
*Assistant Examiner* — Carlos J Gamino
(74) *Attorney, Agent, or Firm* — Verrill Dana, LLP; Robert L. Hover

(57) ABSTRACT

A method of diffusion bonding metal or metal alloy containing workpieces, comprises (a) coating the bonding surfaces of the metal or metal alloy containing workpieces with a layer of a coating material, (b) abrading the coated bonding surfaces to remove surface oxide, the coating material being in liquid form, (c) removing excess coating material or excess abraded metal or metal alloy containing workpiece material from the coated bonding surfaces, and (d) diffusion bonding the coated bonding surfaces of the metal or metal alloy containing workpieces together. The coating material is operable to form a stable barrier on the bonding surfaces of the metal or metal alloy containing workpieces under ambient conditions, and evaporates from the bonding surfaces under diffusion bonding conditions. There is also a (Continued)

bonded workpiece formed using the method of diffusion bonding metal or metal alloy containing workpieces.

17 Claims, 1 Drawing Sheet

(56) References Cited

U.S. PATENT DOCUMENTS

| | | | | |
|---|---|---|---|---|
| 3,762,965 A | * | 10/1973 | Amin | B23K 35/3612 |
| | | | | 148/26 |
| 3,937,387 A | | 2/1976 | Fletcher et al. | |
| 3,963,529 A | * | 6/1976 | Tsunashima | B23K 35/3612 |
| | | | | 228/223 |
| 4,511,488 A | * | 4/1985 | Matta | C11D 3/18 |
| | | | | 510/432 |
| 4,941,929 A | * | 7/1990 | Tecle | B23K 35/36 |
| | | | | 148/26 |
| 4,948,457 A | | 8/1990 | Cooper et al. | |
| 5,156,326 A | * | 10/1992 | Gibson | B23K 35/3605 |
| | | | | 148/26 |
| 5,213,624 A | * | 5/1993 | Williams | C11D 3/18 |
| | | | | 510/423 |
| 5,391,234 A | * | 2/1995 | Murphy | C11D 7/265 |
| | | | | 510/202 |
| 5,421,899 A | * | 6/1995 | Hamilton | B01D 17/00 |
| | | | | 134/40 |
| 5,514,294 A | * | 5/1996 | Bohnert | C11D 7/5031 |
| | | | | 134/40 |
| 5,542,983 A | * | 8/1996 | Hamilton | C11D 3/18 |
| | | | | 134/40 |
| 8,963,042 B2 | | 2/2015 | Sigler et al. | |
| 2006/0215974 A1 | * | 9/2006 | Maida | G02B 6/4492 |
| | | | | 385/100 |
| 2012/0080216 A1 | * | 4/2012 | Abe | C22C 9/00 |
| | | | | 420/587 |
| 2015/0315712 A1 | * | 11/2015 | Hawes | C11D 11/0029 |
| | | | | 510/257 |
| 2017/0095883 A1 | * | 4/2017 | Takada | B23K 35/025 |

FOREIGN PATENT DOCUMENTS

| | | |
|---|---|---|
| GB | 2380491 A | 4/2003 |
| JP | S59178188 A | 10/1984 |

OTHER PUBLICATIONS

"Diffusion bonding of hot roller 705 aluminium alloy", Huang et al., Materials Science and Technology, 1998, 14:5, 405-410.

* cited by examiner

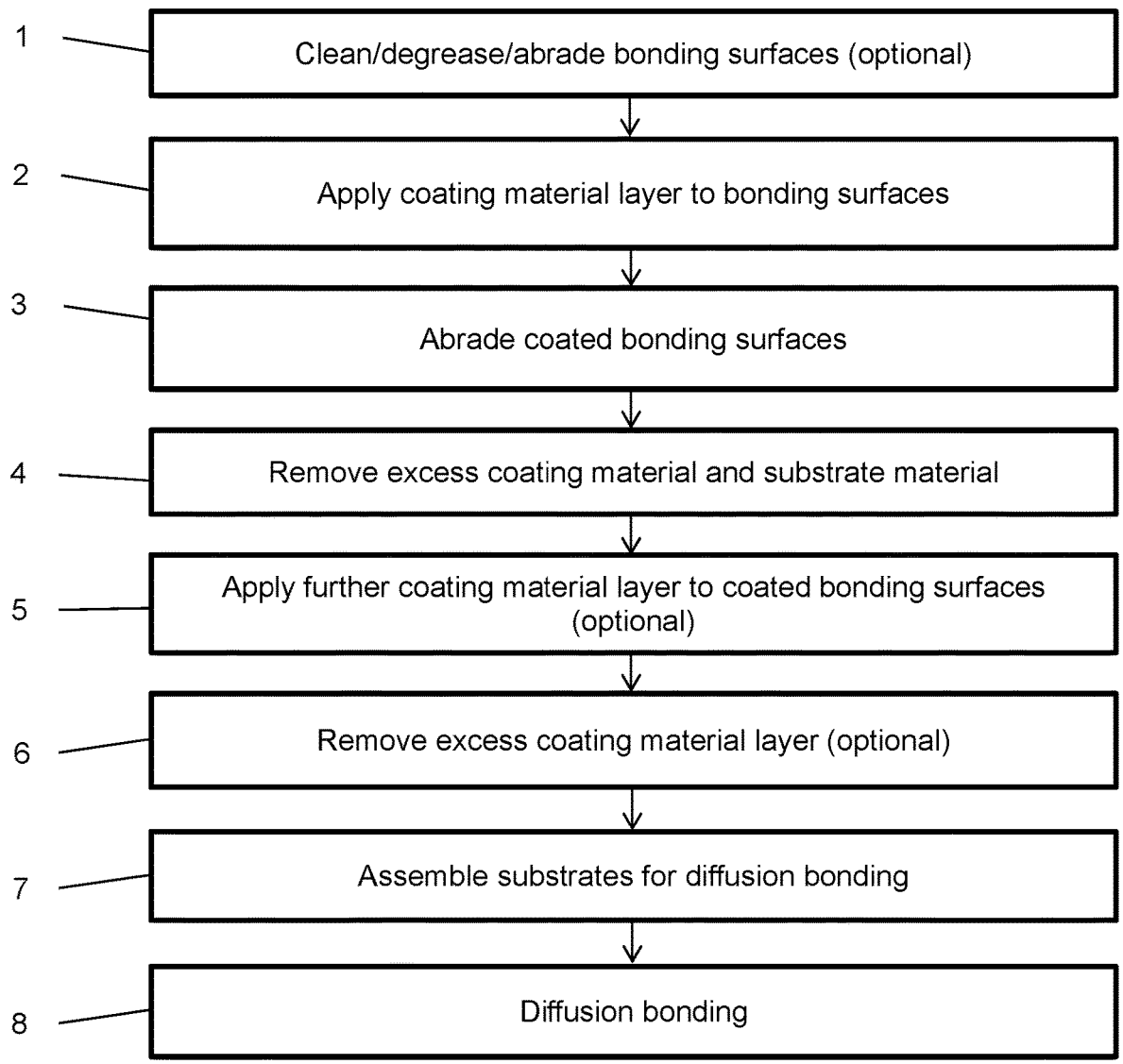

DIFFUSION BONDING WITH A BONDING SURFACE COATING MATERIAL

CROSS-REFERENCE TO RELATED APPLICATION

This application is a United States National Stage of International Application No. PCT/GB2019/051279, filed May 9, 2019, the entire contents of which is incorporated in the present application by reference.

The present invention is directed towards a method of diffusion bonding metal or metal alloy containing workpieces, particularly those workpieces containing metal or metal alloys that form a tenacious surface oxide layer, such as aluminium and its alloys.

Diffusion bonding is a solid-state bonding technique known in the art for use with metal or metal alloy containing workpieces. It utilises a combination of applied pressure (load) and elevated temperature to accelerate the diffusion of atoms across an interface and bond workpieces together. The advantages associated with diffusion bonding include its capability of bonding workpieces of both similar and dissimilar materials; the provision of excellent mechanical and physical properties of the bond itself; the high dimensional tolerance it demonstrates, in particular when joining precision workpieces such as heat exchangers; and its ability to bond workpieces having complex shapes. Diffusion bonding also demonstrates the advantages commonly associated with solid-state bonding processes, such as cleanliness and lack of fusion defects.

The surface of metal or metal alloy containing workpieces, such as those containing aluminium or an alloy thereof, have a tendency to oxidise and rapidly form a tenacious surface oxide layer upon exposure to oxygen, i.e. upon exposure to air. For example, upon exposure to oxygen, the surface of an aluminium containing workpiece rapidly forms a stable, adherent film composed mainly of alumina (aluminium (III) oxide) on its surface. Such tenacious surface oxide layers have made it difficult to bond workpieces using conventional fusional and solid-state bonding techniques, such as diffusion bonding. There is therefore a desire to provide a method of solid-state bonding, i.e. a method of diffusion bonding, for metal or metal alloy containing workpieces which form a tenacious surface oxide layer.

GB 2,380,491 B discloses a surface treatment process consisting of the removal of a surface oxide layer, followed by deposition of a protective metallic layer to prevent re-formation of the surface oxide layer prior to diffusion bonding. This addition of a protective metallic layer is expensive and can lead to the formation of intermetallic or other undesirable compounds.

U.S. Pat. No. 3,937,387 A describes a method for diffusion bonding of aluminium alloys using oxide cleaning methods and the subsequent deposition of a protective polymer coating, which is then removed prior to bonding. Problems with this technique exist in that the cleaning processes are very harsh and the polymer sealants used are often environmentally harmful. In addition, the polymer sealants are also likely to undergo thermal decomposition in the furnace during diffusion bonding, potentially leaving deleterious residues.

A method of diffusion bonding is also disclosed in U.S. Pat. No. 4,948,457 A, the method utilising a grit blasting step, followed by a chemical oxide removal step, before the compression and heating of the components to form diffusion bonds. However, grit blasting can cause grain coarsening at the bonding interface which can lead to both lower bond strength and the inclusion of trapped grit in the bond itself.

The publication 'Diffusion bonding of hot roller 7075 aluminium alloy', Huang et al., Materials Science and Technology, 1998, 14:5, 405-410, describes a method of preparing a surface of a workpiece prior to diffusion bonding, the surface being mechanically polished, then electropolished, brushed with a stainless steel wool whilst immersed in an organic solution containing polymer components, and finally coated with a fresh layer of the organic solution. Problems exist with such a technique in that the required electropolishing step is undesirable for large scale use, in addition to the inclusion of polymer components in the organic solution potentially leaving deleterious residues.

Other known solid-state bonding methods include: using various metallic interlayers and transient liquid-phase techniques; bombarding a workpiece with ions to remove oxide layers; and utilising pre-loading or relative movement of the workpieces to self-abrade. However, problems with these methods exist in that the techniques are expensive, often inappropriate for precision components and can lead to unwanted bond debris and less-than-optimum bond strengths.

It is an object of the aspects of the present invention to provide a solution to the above mentioned or other problems.

According to a first aspect of the present invention, there is provided a method of diffusion bonding metal or metal alloy containing workpieces, the method comprising:

(a) coating the bonding surfaces of the metal or metal alloy containing workpieces with a layer of a coating material, (b) abrading the coated bonding surfaces to remove surface oxide, the coating material being in a liquid form, (c) removing excess coating material or excess abraded metal or metal oxide containing workpiece material from the coated bonding surfaces, and (d) diffusion bonding the coated bonding surfaces of the metal or metal alloy containing workpieces together, wherein the coating material is operable to form a stable barrier on the bonding surfaces of the metal or metal alloy containing workpieces under ambient conditions, and evaporates from the bonding surfaces of the metal or metal alloy containing workpieces under diffusion bonding conditions.

It has been surprisingly and advantageously found that the method according to the first aspect of the present invention facilitates diffusion bonding of metal or metal alloy containing workpieces which form a tenacious surface oxide layer upon exposure to oxygen. Furthermore, the present invention enables the use of environmentally-safe chemicals; does not require rapid assembly or the application of load (pressure) following cleaning and prior to diffusion bonding; does not require extreme roughening steps such as shot blasting, or bath immersion; and does not utilise polymer coatings or metallic interlayers.

By the term "diffusion bonding" as used herein, is meant the solid-state bonding technique in which metal or metal alloy containing workpieces, of either similar or dissimilar materials, are bonded together by the formation of a diffusion bond between the bonding surfaces of each of the metal or metal alloy containing workpieces, using applied force at an elevated temperature. The diffusion bonding can take place in a vacuum or inert atmosphere.

By the term "diffusion bonding conditions" as used herein, is meant the conditions to which the metal or metal alloy containing workpieces are exposed when they are within the closed furnace for diffusion bonding. These conditions include the temperature within the furnace including the temperature (thermal) cycling specifications (such as ramp-up and ramp-down rates), the time spent within the furnace, and the load applied (pressure) to the metal or metal alloy containing workpieces whilst within the furnace.

In the diffusion bonding process according to the present invention, the metal or metal alloy containing workpieces to be bonded together are assembled before being loaded into the furnace such that their bonding surfaces are aligned and preferably in direct contact. The metal or metal alloy containing workpieces are then introduced into a diffusion bonding unit comprising a furnace, i.e. furnace loading, and the furnace is closed to the surrounding environment such that the metal or metal alloy containing workpiece is exposed to the furnace atmosphere and diffusion bonding can take place. In the closed furnace, the metal or metal alloy containing workpieces are exposed to the diffusion bonding conditions appropriate to the metal or metal containing workpieces undergoing diffusion bonding, such that the diffusion bonding temperature appropriate for the metal or metal alloy containing workpiece is reached during an appropriate thermal cycle.

By the term "bonding surface" as used herein, is meant the surface of the metal or metal alloy containing workpiece on the side of the metal or metal alloy containing workpiece that is intended to be joined to the corresponding bonding surface of another metal or metal alloy containing workpiece during the diffusion bonding process. In the art, these are often called the "faying surfaces".

By the term "ambient conditions" as used herein, is meant the normal range of conditions of the surrounding environment, such as the workshop environment in which the process of the first aspect of the present invention is carried out, i.e. the range of temperatures, pressures and atmospheric conditions to which the metal or metal alloy containing workpieces are exposed prior to insertion into the furnace for diffusion bonding. Typically, these conditions include a temperature of from 10 to 35° C., a pressure from 20 to 110 kPa pressure, and the environment is typically an oxygen-containing atmosphere, often referred to as air.

By the term "surface oxide" as used herein, is meant a metal or metal alloy oxide that has formed upon the surface of the metal or metal alloy containing workpieces, including upon the bonding surface. The surface oxide likely covers all or substantially all of the surface area of the surface of the metal or metal alloy containing workpiece. This surface oxide will have formed upon exposure of the surface of the metal or metal alloy containing workpiece to oxygen, i.e. upon exposure to air. The term "surface oxide" is used interchangeably with the term "tenacious surface oxide" and "tenacious surface oxide layer" herein.

By the term "stable barrier" as used herein, is meant that, when coated on a bonding surface of a metal or metal alloy containing workpiece, the coating material forms an intact layer; remains intact during application, storage, and furnace loading conditions; forms a barrier to oxygen diffusion under pre-furnace loading conditions; wets the bonding surface of the metal or metal alloy containing workpiece; does not react with the bonding surface of the metal or metal alloy containing workpiece to which it is applied; does not substantially evaporate prior to closure of the furnace; has a boiling point lower than the temperature at which it undergoes thermal decomposition; has a boiling point under furnace atmosphere that is substantially lower than the diffusion bonding temperature of the metal or metal alloy containing workpiece such that it is fully removed from the surface by evaporation prior to the initiation of the diffusion bonding; and maintains a barrier to oxygen diffusion during the abrasion of the bonding surfaces of the metal or metal alloy containing workpieces. The barrier to oxygen diffusion during abrasion is maintained via the self-healing of the coating material. By the term 'self-healing' as used herein is meant the ability of the coating material to remain in a liquid form, fully covering the bonding surfaces of the metal or metal alloy containing workpieces (both the parts of the bonding surface already abraded and the parts of the bonding surface still to be abraded) whilst the bonding surfaces are being abraded, i.e. during abrasion of the bonding surfaces, the surface oxide being abraded is prevented from reforming by the maintenance of a layer of the coating material in liquid form upon the abraded surface. This 'self-healing' property of the coating material is due to the viscosity and surface wetting ability of the coating material.

The coating material may comprise any suitable organic material. Preferably, the coating material comprises the monoterpene alcohol, terpineol (also known as alpha-terpineol or terpene alcohol). Advantageously, the use of terpineol means that it is not necessary to use complex mixtures of polymers and solvents in the coating material of the first aspect of the present invention. Alternatively, the coating material may comprise paraffin wax.

Terpineol may be present in the coating material in any suitable amount. Preferably, the coating material comprises at least 75% terpineol by volume, more preferably at least 90% terpineol by volume, and most preferably, the coating material is terpineol (100% of the coating material by volume). It will be understood by a skilled person that most commercially available terpineol may contain impurities which do not affect the efficacy of the coating material in the aspects of the present invention.

Preferably, the coating material does not comprise dissolved polymers and/or compounds having polymerisable functional groups.

The coating material according to the first aspect of the present invention is in a liquid form during the abrasion of the coated bonding surfaces in step (b), such that the barrier to oxygen diffusion during abrasion is maintained via the self-healing of the coating material. It will be understood by a skilled person that the coating material may be applied to the bonding surfaces of the metal or metal alloy containing workpieces in either a liquid or solid-state form and when coated on the bonding surfaces of the metal or metal alloy containing workpieces, the coating material may be in a liquid or solid-state form under ambient conditions. The terms "liquid" or "liquid form" as used herein are well understood to the skilled person. However, according to the first aspect of the present invention, the coating material must be in a liquid form during step (b). Preferably, the coating material is in a liquid form during steps (a), (b) and (c). It will be well understood by a skilled person as to how the coating material may be maintained in a liquid form.

The coating material may be applied to the bonding surfaces of the metal or metal alloy containing workpieces by any suitable method. Methods of applying said coating material will be well known to a person skilled in the art. Suitable application methods include, but are not limited to the following: dipping, spraying, brushing, screen-printing, flow coating, and rubbing. It will be understood to a skilled person that a coating material comprising paraffin wax may be applied to the bonding surfaces in either liquid or solid form. If applied in a solid form, in order for the coating material to be in a liquid form during abrasion of step (b), the paraffin wax may be melted. The coating material may then re-solidify if cooled below the melting temperature of the coating material prior to diffusion bonding. All, substantially all or part of the surface area of the bonding surface of the metal or metal alloy containing workpieces may be coated by the coating material. Preferably, all of the surface area of the bonding surfaces of the metal or metal alloy containing workpieces is coated with a layer of the coating material.

The coating material may be applied to the bonding surface to any suitable thickness. Preferably, the coating material is applied to the bonding surfaces of the metal or metal alloy containing workpieces at a thickness from about 50 micrometres to 500 micrometres to prevent surface oxidation and oxygen diffusion under ambient conditions.

The coating material may have any suitable viscosity. Preferably, the coating material has a viscosity up to 5000 mPa·s (5000 centipoise), more preferably from 1 to 1000 mPa·s (1 to 1000 centipoise), and most preferably from 30 to 500 mPa·s (30 to 500 centipoise).

Preferably, when the coating is liquid and coated on a bonding surface of a metal or metal alloy containing workpiece, the coating material has a contact angle of less than 90° of arc with the bonding surface of the metal or metal alloy containing workpiece.

Preferably, the coating material has a vapour pressure of greater than 2.66645 kPa (20 Torr).

It will be understood by a skilled person that the method of diffusion bonding according to the first aspect of the present invention enables the bonding of metal or metal alloy containing workpieces to form a bonded workpiece, the metal or metal alloy containing workpieces of the bonded workpiece being bonded by a diffusion bond between each of their respective bonding surfaces. The metal or metal alloy containing workpieces being bonded may either be of the same or different workpiece material. It will be understood by a skilled person that two or more metal or metal alloy containing workpieces may be bonded together. Further, it will be understood by a skilled person that multiple metal or metal alloy containing workpieces may be bonded and may be stacked on top of each other during diffusion bonding, and also assembled in overlapping configurations.

Any suitable metal or metal alloy containing may be used in the present invention. The term "workpiece material" as used herein is intended to be used interchangeably with the term "workpiece". The metal or metal alloy containing workpieces may be metal matrix composites such as those comprising a metal or metal alloy and another material such as an organic compound, for example, silicon carbide. Preferably, the metal or metal alloy of the metal or metal alloy containing workpieces is selected from aluminium, titanium, beryllium, zirconium, iron (e.g. stainless steel), nickel, chromium, cobalt, lithium, magnesium, and the alloys thereof. More preferably, the metal or metal alloy of the metal or metal alloy containing workpieces is selected from aluminium, titanium, and the alloys thereof. The metal or metal alloy containing workpiece may also be a nickel-based superalloy containing aluminium or titanium. Most preferably, the metal or metal alloy of the metal or metal alloy containing workpiece is aluminium or an alloy thereof, such as 2000-series, 7000-series and 6000-series alloys (e.g. 6061). Preferably, the metal or metal alloy containing workpieces bonded together are of the same material.

The bonding surfaces of the metal or metal alloy containing workpieces to be bonded may have any suitable geometry, including geometries such as curved and more complex-shapes. Preferably, the bonding surfaces of the metal or metal alloy containing workpieces bonded together have the same geometry. Preferably, the bonding surfaces of the metal or metal alloy containing workpieces are flat.

The abrasion of the coated bonding surfaces of the metal or metal alloy containing workpieces in step (b) may be carried out using any suitable technique. Such techniques will be well known to a skilled person and include manual, semi- and fully automatic abrasion techniques. One suitable method of abrasion is using abrasive paper such as silicon carbide or silica. Typically, the abrasive grade of such paper is in the region of 20 to 2400 grit according to ISO 6344 standard. Preferably, the abrasion technique is a semi-automated technique using a suitable tool such as a random orbital sander. Full automation using a polishing machine is also possible.

It will be understood by a skilled person that the abrasion step (b) is required to remove surface oxide that has formed on the bonding surfaces of the metal or metal alloy containing workpieces as without removal of this surface oxide, diffusion bonding will be severely inhibited and it is unlikely that a strong diffusion bond will be formed. It will further be understood by a skilled person that the surface abrasion technique may be applied in an appropriate manner and for sufficient time such that all of the surface area of the coated bonding surface has been abraded. However, any preferential polishing of the edges of the bonding surfaces of the metal or metal alloy containing workpiece should be minimised. If required, a vacuum table can be used to secure the metal or metal alloy containing workpieces to provide easier and quicker preparation.

Excess coating material or excess abraded metal or metal alloy containing workpiece material formed as a result of the abrasion step (b), may be removed in step (c) by any suitable method. It will be understood by a skilled person that the terms "excess coating material" and "excess abraded metal or metal alloy containing workpiece material" used in relation to step (c), refer to the material of the coating or metal or metal alloy containing workpieces that has been abraded during step (b) and is no longer attached to the bonding surfaces of the metal or metal alloy containing workpieces. Preferably, excess coating material or excess abraded metal or metal alloy containing workpiece material is removed from the coated bonding surfaces using a suitable tool such as a rubber edge wiper to lightly pass over the bonding surface.

The diffusion bonding of step (d) may be carried out either immediately or up to 24 hours after the preceding method step. Preferably, the diffusion bonding of step (d) is carried out within 1 to 2 hours of the preceding method step, and more preferably, immediately after the preceding method step.

Preferably, the metal or metal alloy containing workpieces to be bonded are assembled for diffusion bonding with the coated bonding surfaces in direct contact so as to provide a substantially oxygen-free bonding region.

It will be understood by the skilled person that the diffusion bonding conditions in the diffusion bonding process are dependent upon the metal or metal alloy containing workpiece material used. Typically, diffusion bonding conditions use a temperature of 60-80% of the melting temperature of the metal or metal alloy containing workpiece material, a pressure suitable to provide intimate contact of the surfaces to be bonded (typically 1-50 MPa), for a sufficient time to achieve adequate diffusion. For example, for bonding aluminium alloy 6061 containing workpieces together, the diffusion bonding conditions range from 450 to 550° C., from 15 minutes to 4 hours in the furnace and have an applied load (pressure) of from 0.5 to 5 MPa.

Optionally, prior to step (a), the bonding surfaces of the metal or metal alloy containing workpieces may be degreased, cleaned or abraded to remove contaminants. This can be achieved by wiping the bonding surfaces with a solvent such as acetone, or laboratory degreasing agents and surfactants, or via ultrasonic cleaning.

Optionally, the coated bonding surfaces of the metal or metal alloy containing workpieces may be coated with a further layer of the coating material after step (c), and before step (d). Preferably, all of the surface area of the coated bonding surfaces are coated with the further layer. If a further layer of the coating material is applied, it is preferable to then subsequently remove excess coating material with a blade or other tool prior to step (d) and the assembly of the metal or metal alloy containing workpieces for diffusion bonding.

According to a second aspect of the present invention, there is provided a bonded workpiece comprising metal or metal alloy containing workpieces that have been bonded by a method of diffusion bonding comprising:
(a) coating the bonding surfaces of the metal or metal alloy containing workpieces with a layer of a coating material,
(b) abrading the coated bonding surfaces to remove surface oxide, the coating material being in a liquid form,
(c) removing excess coating material or excess abraded metal or metal alloy containing workpiece material from the coated bonding surfaces, and
(d) diffusion bonding the coated bonding surfaces of the metal or metal alloy containing workpieces together,
wherein the coating material is operable to form a stable barrier on the bonding surfaces of the metal or metal alloy containing workpieces under ambient conditions, and evaporates from the bonding surfaces of the metal or metal alloy containing workpieces under diffusion bonding conditions.

All of the features contained herein may be combined with any one of the above aspects and in any combination.

For a better understanding of the invention, and to show how embodiments of the same may be carried into effect, reference will now be made, by way of example, to the accompanying FIGURE in which:

FIG. 1 shows a flow chart of the method steps according to an embodiment of the first aspect of the invention.

In FIG. 1, the metal or metal alloy of the metal or metal alloy containing workpieces is a 6061 aluminium alloy.

Step 1 is an optional method step in which the bonding surfaces of the metal or metal alloy containing workpieces are cleaned, degreased and/or abraded using a suitable detergent solution, followed by wiping with a solvent such as acetone using a lint free cloth.

Once dried, the bonding surfaces of the metal or metal alloy containing workpieces are coated with a layer of coating material as shown in Step 2.

Step 3 outlines the surface abrasion of the coated bonding surfaces. This is applied for a sufficient period of time such that all of the surface area of the coated bonding surface has been abraded, but preferential polishing of the edges of the bonding surfaces is minimised.

Once the bonding surfaces of the metal or metal alloy containing workpieces have been abraded, excess coating material or excess abraded metal or metal alloy containing workpiece material is removed in Step 4 using a suitable tool, such as a rubber edged wiper being lightly passed over the bonding surface of the metal or metal alloy containing workpiece.

Steps 5 and 6 are optional method steps during which a further layer of the coating material can be applied to the bonding surfaces and then excess coating material removed with a blade or other tool prior to assembly of the metal or metal alloy containing workpieces for diffusion bonding.

In Step 7, the metal or metal alloy containing workpieces are assembled such that the bonding surfaces of the metal or metal alloy containing workpieces are in direct contact with each other.

Referring to step 8, diffusion bonding is carried out once the metal or metal alloy containing workpieces are assembled. The metal or metal alloy containing substrates are exposed to diffusion bonding conditions of from 450 to 550° C., from 15 minutes to 4 hours in the furnace, and have an applied load (pressure) of from 0.5 to 5 MPa to form a bonded workpiece.

The invention claimed is:

1. A method of diffusion bonding metal or metal alloy containing workpieces, the method comprising:
(a) coating bonding surfaces of the metal or metal alloy containing workpieces with a layer of a coating material, wherein the coating material does not comprise dissolved polymers and/or compounds having polymerisable functional groups;
(b) abrading the coated bonding surfaces formed in step (a) to remove surface oxide, the coating material being in a liquid form,
(c) removing excess coating material or excess abraded metal or metal alloy containing workpiece material from the abraded, still coated bonding surfaces formed in step (b), and
(d) diffusion bonding the abraded, still coated bonding surfaces of the metal or metal alloy containing workpieces of step (c) together,
wherein the coating material is operable to form a stable barrier on the bonding surfaces of the metal or metal alloy containing workpieces under ambient conditions, and evaporates from the bonding surfaces of the metal or metal alloy containing workpieces under diffusion bonding conditions.

2. The method according to claim 1, wherein the coating material comprises terpineol.

3. The method according to claim 2, wherein the coating material comprises at least 75% terpineol by volume.

4. The method according to claim 2, wherein the coating material consists of terpineol.

5. The method according to claim 1, wherein the coating material on the bonding surfaces of the metal or metal alloy containing workpieces is in a liquid form during steps (a), (b) and (c).

6. The method according to claim 1, wherein all of the surface area of the bonding surfaces is coated with the layer of the coating material.

7. The method according to claim 1, wherein the coating material has a viscosity from 1 to 100 mPa·s.

8. The method according to claim 1, wherein the metal or metal alloy of the metal or metal alloy containing workpieces is selected from aluminium, titanium, beryllium, zirconium, iron, nickel, chromium, cobalt, lithium, magnesium, and the alloys thereof.

9. The method according to claim 8, wherein the metal or metal alloy of the metal or metal alloy containing workpieces is aluminium or an alloy thereof.

10. The method according to claim 1, wherein the abrasion of the coated bonding surfaces in step (b) is performed using a semi-automated technique.

11. The method according to claim 1, wherein step (d) is carried out within 1 to 2 hours of the preceding method step.

12. The method according to claim 1, wherein the method further comprises an additional method step prior to step (a) in which the bonding surfaces of the metal or metal alloy containing workpieces are degreased, cleaned or abraded.

13. The method according to claim 1, wherein after step (c) and prior to step (d), the method further comprises an additional method step of coating the coated bonding surfaces with a further layer of the coating material.

14. The method according to claim 13, wherein excess coating material formed from the application of the further layer of the coating material is removed prior to step (d).

15. The method according to claim 3, wherein the coating material comprises at least 90% terpineol by volume.

16. The method according to claim 7, wherein the coating material has a viscosity from 30 to 500 mPa·s.

17. The method according to claim 11, wherein step (d) is carried out immediately after the preceding method step.

\* \* \* \* \*